United States Patent [19]

Magocs et al.

[11] Patent Number: 5,473,469
[45] Date of Patent: Dec. 5, 1995

[54] FRONT PROJECTION SCREEN WITH LENTICULAR FRONT SURFACE

[75] Inventors: Stephen Magocs; Scott H. Baker, both of Knoxville, Tenn.

[73] Assignee: Philips Electronics North America Corporation, New York, N.Y.

[21] Appl. No.: 310,195

[22] Filed: Sep. 21, 1994

Related U.S. Application Data

[63] Continuation-in-part of Ser. No. 241,836, May 12, 1994.
[51] Int. Cl.$^6$ .................................................. G03B 21/60
[52] U.S. Cl. ........................... 359/449; 359/452; 359/455
[58] Field of Search ................................... 359/449, 452, 359/454, 455

[56] References Cited

U.S. PATENT DOCUMENTS

| | | | |
|---|---|---|---|
| 4,206,969 | 6/1980 | Gobb et al. | 350/126 |
| 4,298,246 | 11/1981 | Iwamura | 350/122 |
| 4,767,186 | 8/1988 | Bradley, Jr. et al. | 350/128 |
| 4,991,933 | 2/1991 | Park | 350/129 |

*Primary Examiner*—Richard A. Wintercorn
*Attorney, Agent, or Firm*—John C. Fox

[57] ABSTRACT

A front projection screen is made up of a front portion and a rear portion, the front portion having a front surface lenticular lens array and light scattering particles forming a diffusion region between the front and rear surfaces, and the rear portion having a reflective surface spaced apart from the diffusion region. In use, an incoming ray of projected light traverses the diffusion region and the space between the diffusion region and the reflective surface, before being reflected back through these regions again. Thus, the ray traverses different portions of the diffusion region in different directions, increasing the likelihood that the ray will encounter at least one scattering particle, thus reducing the incidence of speckle.

16 Claims, 9 Drawing Sheets

FRONT PROJECTION SCREEN WITH LENTICULAR FRONT SURFACE

This application is a continuation-in-part of application Ser. No. 241,836, filed May 12, 1994.

BACKGROUND OF THE INVENTION

This invention relates to front projection screens, and more particularly relates to such screens having a lenticular front surface.

The development of small display devices such as LCDs (liquid crystal displays) and DMDs (deformable mirror devices) suitable for reproducing video images, has given rise to the need for small aperture projection optics to project these images, and for front projection screens to display the projected images with adequate contrast over a wide viewing angle.

Various front projection screens are known which employ either a rear surface lenticular lens array or a linear fresnel lens array, together with light scattering particles to spread the image into the audience field. See, for example, U.S. Pat. Nos. 4,767,186; 4,964,695; and 4,911,529. These screens may also employ light-absorbing areas between the lens elements to absorb ambient light and thus improve image contrast.

One problem encountered with such small aperture systems is that light may pass through the screen without encountering any of the light scattering particles, giving rise to a phenomenon known as scintillation or speckle, which is the random occurrence of bright spots on the screen. Such scintillation or speckle is obviously undesirable in that it reduces definition, and is distracting to the viewer.

OBJECTS AND SUMMARY OF THE INVENTION

Accordingly, it is an object of the invention is to provide a front projection screen in which the incidence of scintillation or speckle is reduced.

In accordance with the invention, a front projection screen is made up of a front portion and a rear portion, the front portion having a lenticular lens array on its front surface, and incorporating light scattering particles to form a diffusion region between the front and rear surfaces, and the rear portion having a light reflective surface spaced apart from the diffusion region. In use, an incoming ray of projected light traverses the diffusion region and the space between the diffusion region and the reflective surface, before being reflected back through these regions again. Thus, the ray traverses different areas of the diffusion region in different directions, increasing the likelihood that the ray will encounter at least one light scattering particle, and thereby reducing the incidence of speckle.

As used herein, the term "lenticular lens array" means an array of mutually parallel elongated lens elements or lenticules, extending longitudinally across the screen in one direction, and having a defining contour in the transverse direction.

The diffusion region can extend to the rear surface of the front portion, e.g., across the entire thickness of the front portion from the front surface to the rear surface, with the rear portion providing the space between the diffusion region and the reflecting surface. Instead, the diffusion region may be spaced apart from the rear surface of the front portion, e.g., may be confined near the front surface, in which case the remaining region between the diffusion region and the rear surface of the front portion can function as a spacer region between the diffusion region and the reflecting surface. The reflective surface may then be located at the rear surface of the front portion.

In addition, the rear surface of the front portion may define a second lenticular lens array, parallel to the first array, with each lenticular lens element or lenticule of the first array having a corresponding lenticule in the second array.

In accordance with another embodiment of the invention, the front and/or the rear lenticular array is made up of lenticules having steep sidewalls, so that at least some portion of the light entering these lenticules is totally internally reflected by the sidewalls and concentrated in the tip region of the lenticule. This total internal reflection (TIR) is described in more detail in the above-referenced U.S. Pat. Nos. 4,767,186 and 4,964,695, the specifications of which are incorporated herein by reference.

In any of the above embodiments and variations of embodiments, a pattern or matrix of light-absorbing material may be present between the lenticules of the front and/or rear lenticular lens array, in order to enhance the contrast of the image displayed in the presence of ambient light.

BRIEF DESCRIPTION OF THE DRAWING

The invention will now be described in more detail with reference to a number of specific embodiments, as illustrated in the accompanying drawing, in which.

DESCRIPTION OF THE PREFERRED EMBODIMENTS

Figure 1:
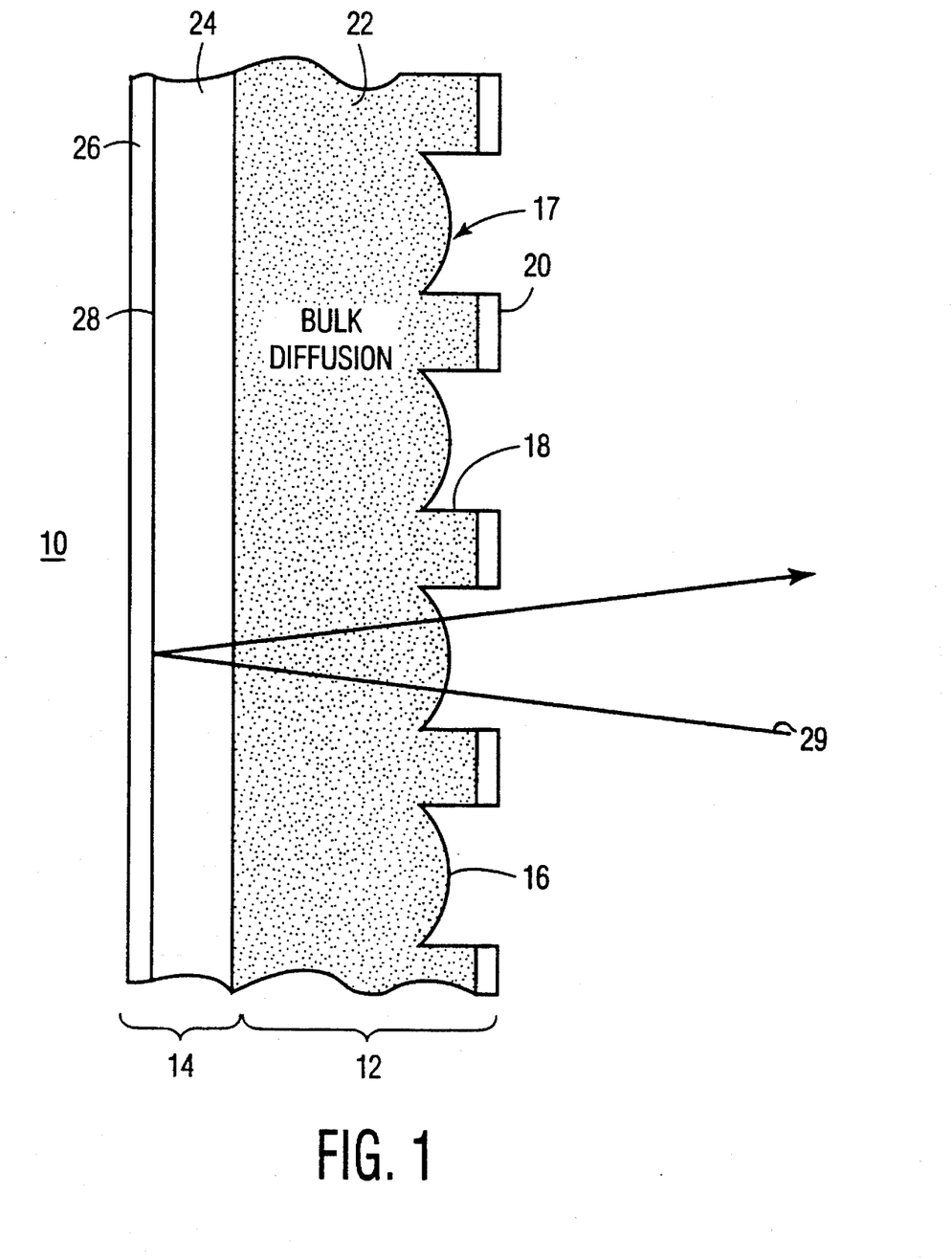
FIG. 1 is a schematic cross section of one embodiment of the screen of the invention, having a front portion with a front lenticular array, a light absorbing structure associated with the array, and bulk diffusion, and a rear portion having a rear reflective surface.

Referring now to FIG. 1, screen 10 is composed of front portion 12 and rear portion 14. Front portion 12, of a light transmissive material, such as polymethyl methacrylate, has a front surface 16 defining a lenticular lens array 17, made up of individual lenticules oriented parallel to one another and extending longitudinally across the screen. FIG. 1 is a cross section taken transverse to the longitudinal direction, showing the contour of the lenticules. The front surface also has a light absorbing structure including raised ribs 18, extending between the lenticules, and a light absorbing layer 20 on top of these ribs. This layer 20 is intended to absorb a large portion of light striking the screen at relatively large angles (e.g., ambient light) while absorbing only a small portion of the light striking the screen at small angles (e.g., projected light).

The first portion 12 has light scattering particles dispersed throughout the bulk of the portion, to form diffusion region 22.

The second portion 14 of screen 10 is made up of spacer layer 24 of a light transmissive material, such as glass, and layer 26, forming a light reflective surface 28. Layer 28 may be of any suitable mirror-forming material, such as silver or aluminum.

The function of spacer layer 24 is to provide a space between the diffusion region 12 and the reflective surface 28. Thus, an incoming light ray 29 passes through diffusion region 22, then through spacer layer 24, then is reflected back through these layers again before exiting the screen. This arrangement results in significantly less speckle than is seen in the front projection screen shown in FIG. 8.

Figure 2:
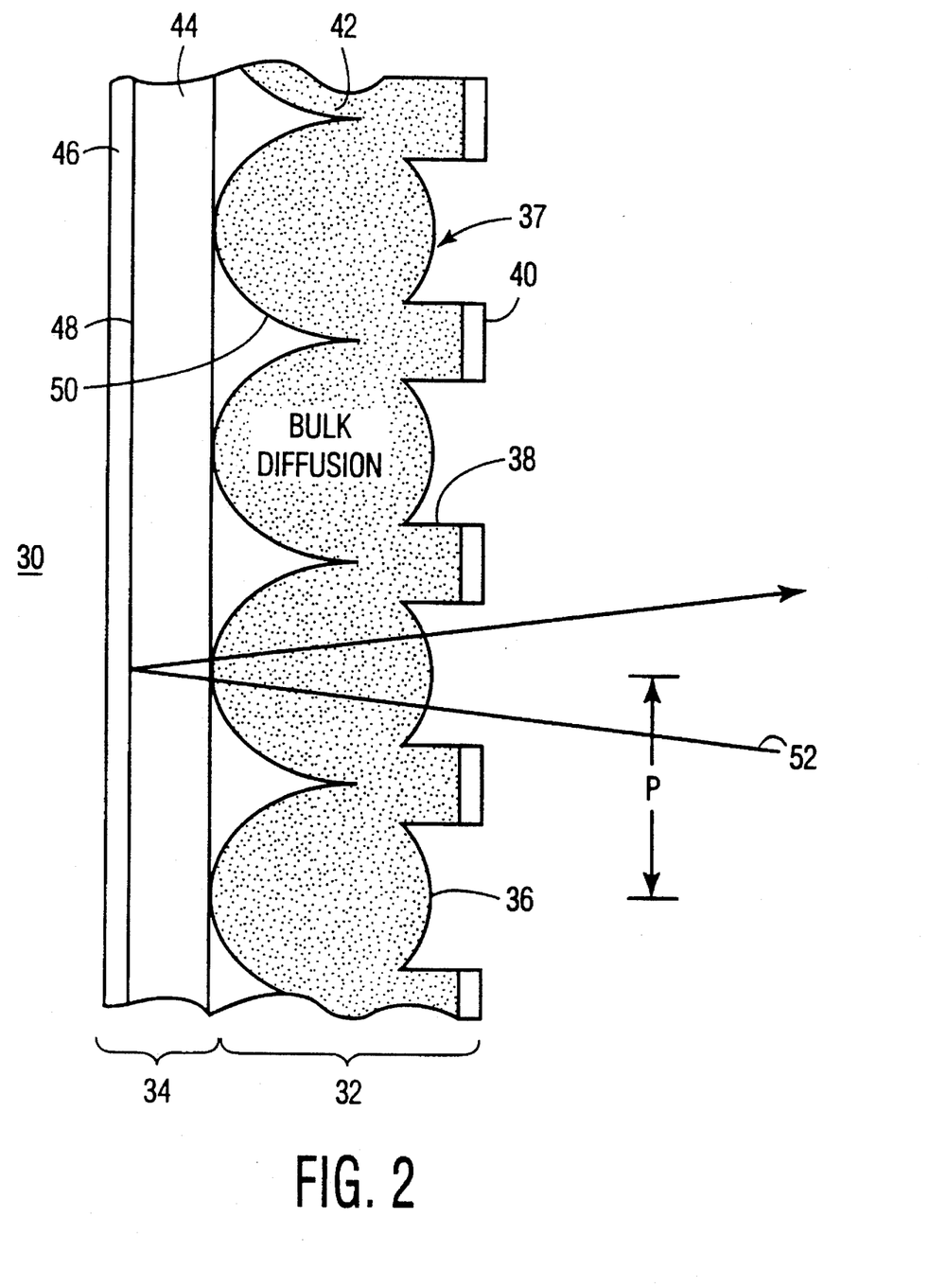
FIG. 2 is a schematic cross section of another embodiment of the screen of the invention, similar to that shown in FIG. 1, except that the front portion also has a rear lenticular lens array.

FIG. 2 shows another embodiment of the invention, similar to the embodiment of FIG. 1, except that front portion 32 of screen 30 has a second lenticular array 50 on the rear surface. This lenticular array is also composed of mutually parallel, longitudinally oriented lenticules, each lenticule opposed to a corresponding lenticule of the front surface. Thus, the pitch P (distance between adjacent lenticules of an array) is the same for both the front and the rear arrays, while the contour of the lenticules of the second array may be different from the contour of the first array.

Figure 8:
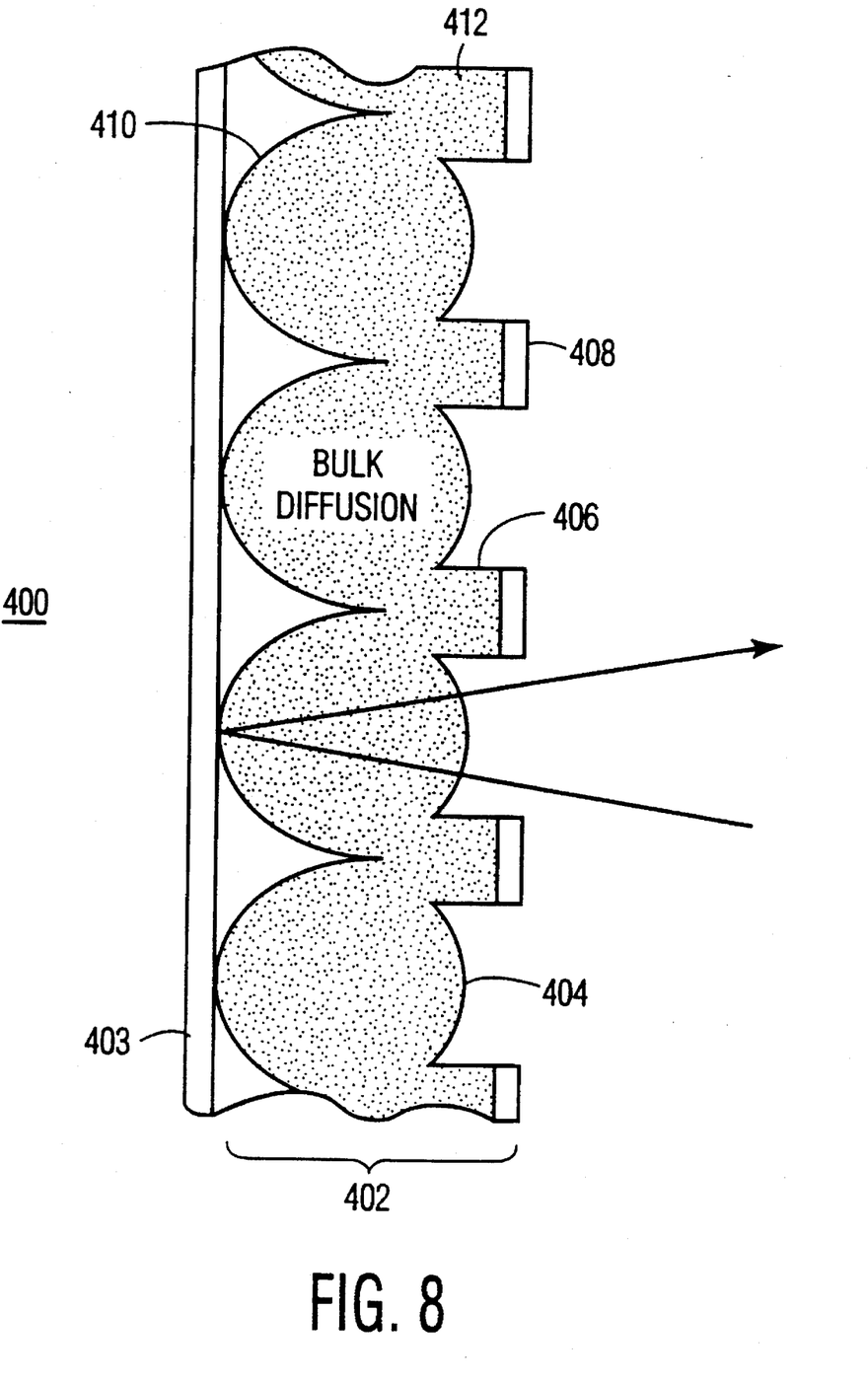
FIG. 8 is a schematic cross section of a front projection screen similar to that of FIG. 2, except that it lacks the spacer layer.

As in the embodiment of FIG. 1, a ray 52 traverses the bulk diffusion region 42 twice, the second traverse being after passage through spacer layer 44 and reflection from surface 48, resulting in significantly less speckle than is seen in the screen of FIG. 8.

Figure 3:
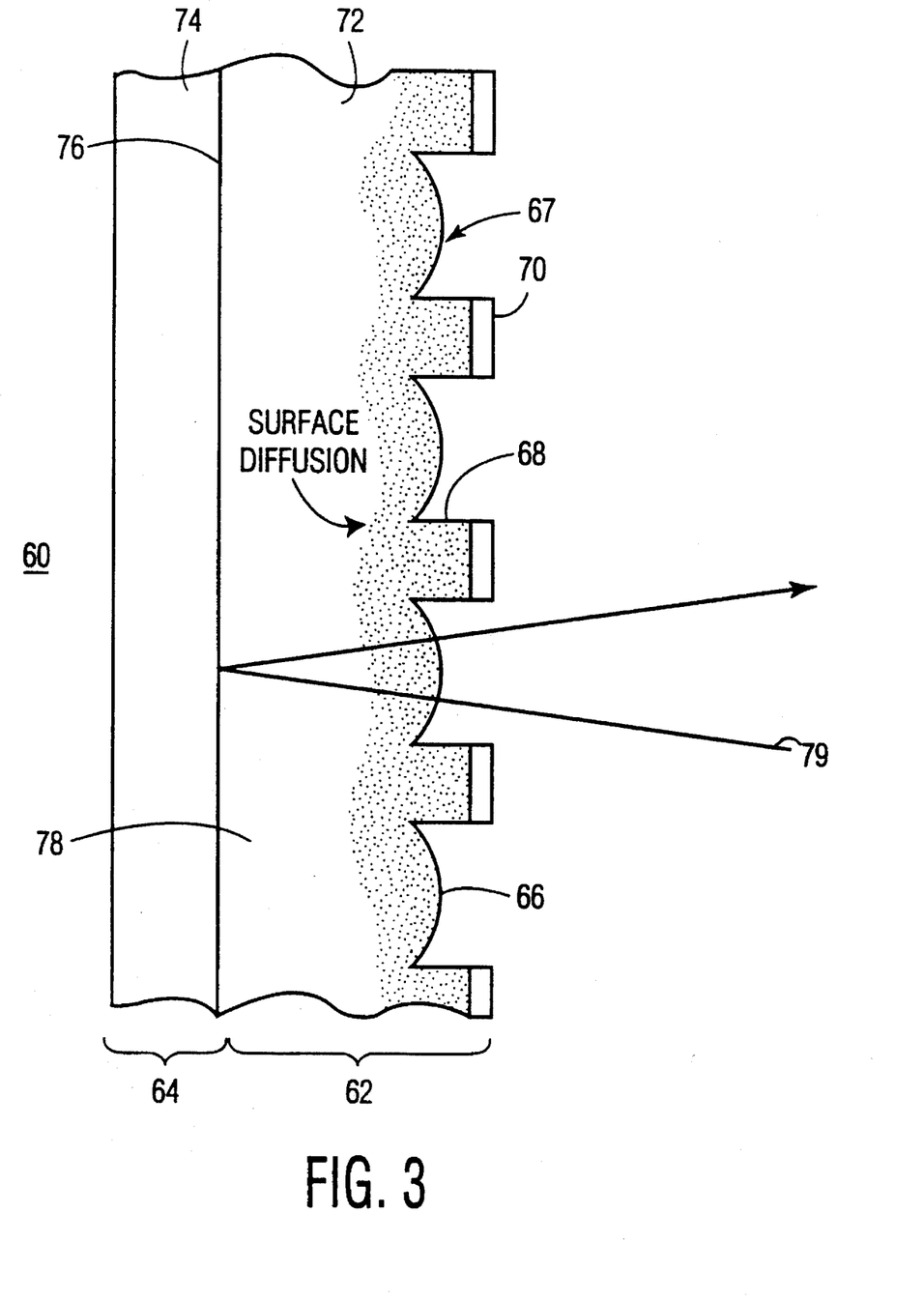
FIG. 3 is a schematic cross section of another embodiment of the invention, similar to that of FIG. 1, except that the diffusion region is confined near the front surface, and the rear portion has a front reflecting surface.

FIG. 3 shows another embodiment of the invention, similar to the embodiment of FIG. 1, except that the light scattering particles of screen 60 are confined to a diffusion region 72 near the front surface of front portion 62, and that rear portion 64 is composed of layer 74, which forms a light reflective surface 76 where it meets front portion 62. In this configuration, the spacer layer 24 of FIG. 1 is replaced by the spacer region 78 in front portion 62, which region 78 does not have any light scattering particles. Thus, ray 79 upon entering the screen, traverses diffusion region 72, then spacer region 78, then is reflected from surface 76, to again traverse spacer region 78 and diffusion region 72, resulting in a reduced incidence of speckle when compared to the screen of FIG. 8.

In the FIG. 3 embodiment, the layer 74 may be of substantial thickness, to provide mechanical support for the front portion, or may be a relatively thin layer, for example, of a coated or vapor deposited material, on the rear surface of the front portion.

Figure 4:
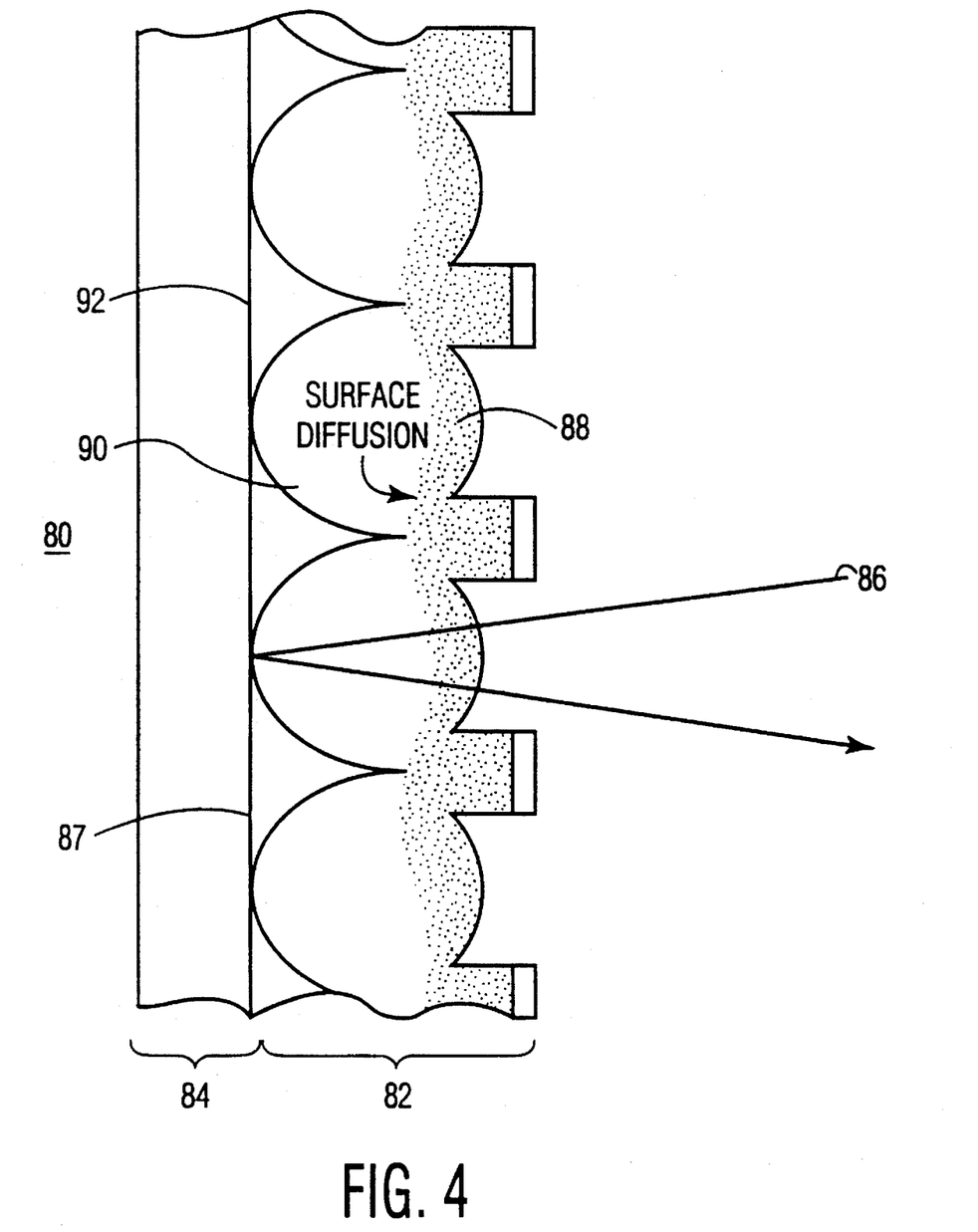
FIG. 4 is a schematic cross section of still another embodiment of the invention, similar to that of FIG. 3, except that the front portion also has a rear lenticular lens array.

FIG. 4 shows yet another embodiment of the invention, similar to the embodiment of FIG. 3, in which the front portion 82 of screen 80 has a second lenticular surface 84, similar to lenticular surface 50 of FIG. 2. In this embodiment, incoming ray 86 traverses diffusion region 88, then spacer region 90, then is reflected from surface 92, then again traverses spacer region 90 and diffusion region 88 before exiting screen 80, resulting in a reduced incidence of speckle when compared to the screen of FIG. 8.

Figure 5:
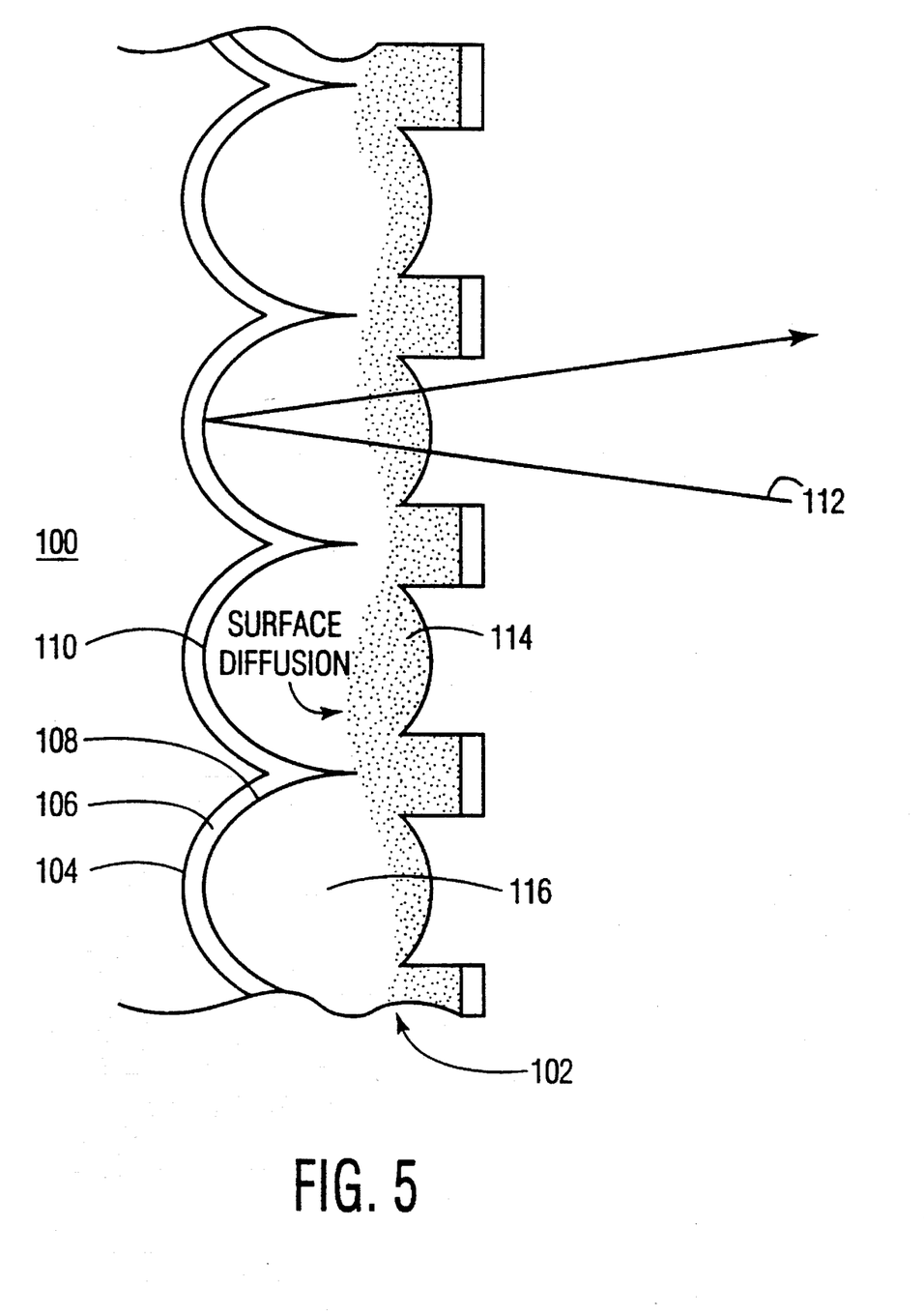
FIG. 5 is a schematic cross section similar to that of FIG. 4, except that the reflective layer follows the contour of the rear lenticular array.
Figure 6:
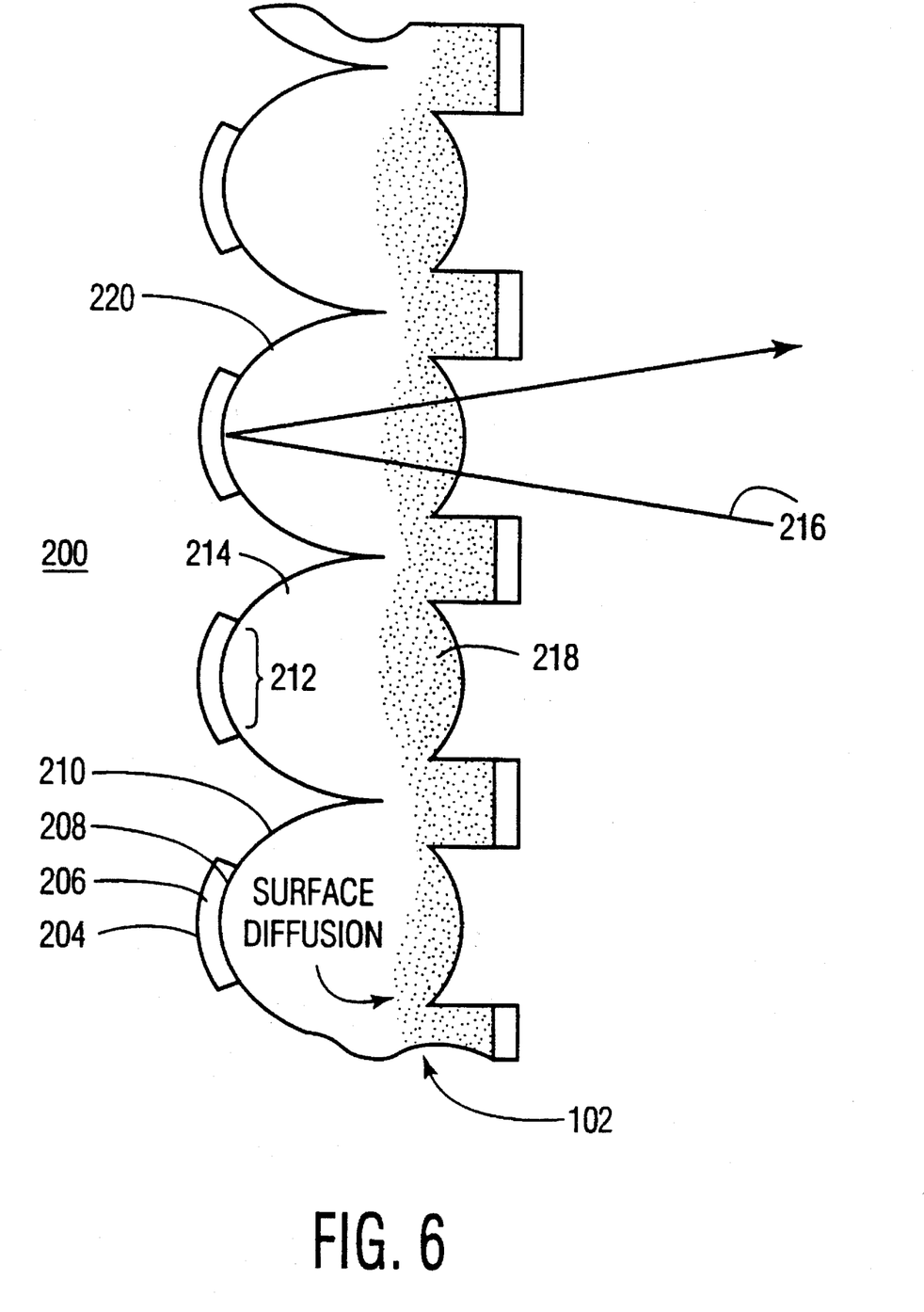
FIG. 6 is a schematic cross section similar to that of FIG. 5, except that the reflective layer is confined to the tip regions of the rear lenticules.

FIGS. 5 and 6 show two different variations of the embodiment of FIG. 4. In FIG. 5, screen 100 is composed of front portion 102, similar to front portion 82 of FIG. 4, and rear portion 104, consisting simply of a layer of material 106 which forms reflective surface 108 conforming to the contour of second lenticular surface 110. Layer 104 may, for example, be a vapor deposited layer of silver or aluminum. Thus, ray 112 upon entering screen 100, traverses diffusion region 114 and spacer region 116, is reflected at surface 108, and again traverses spacer region 116 and diffusion region 114, before exiting the screen, resulting in a reduced incidence of speckle when compared to the screen of FIG. 8.

In FIG. 6, screen 200 is composed of front portion 202, similar to front portion 102, and rear portion 204, now reduced to separate layers of a material 206 confined to the tip portions 212 of the lenticules 220 of second lenticular surface 210. Material 206 may be, for example, silver or aluminum, vapor deposited through a mask, or coated onto the tips with an applicator such as a roller, having a much larger dimension than that of the lenticules. Thus, ray 216 upon entering screen 200, traverses diffusion region 218 and spacer region 220, is reflected at surface 208, and again traverses spacer region 220 and diffusion region 218, before exiting the screen, resulting in a reduced incidence of speckle when compared to the screen of FIG. 8.

Figure 7:
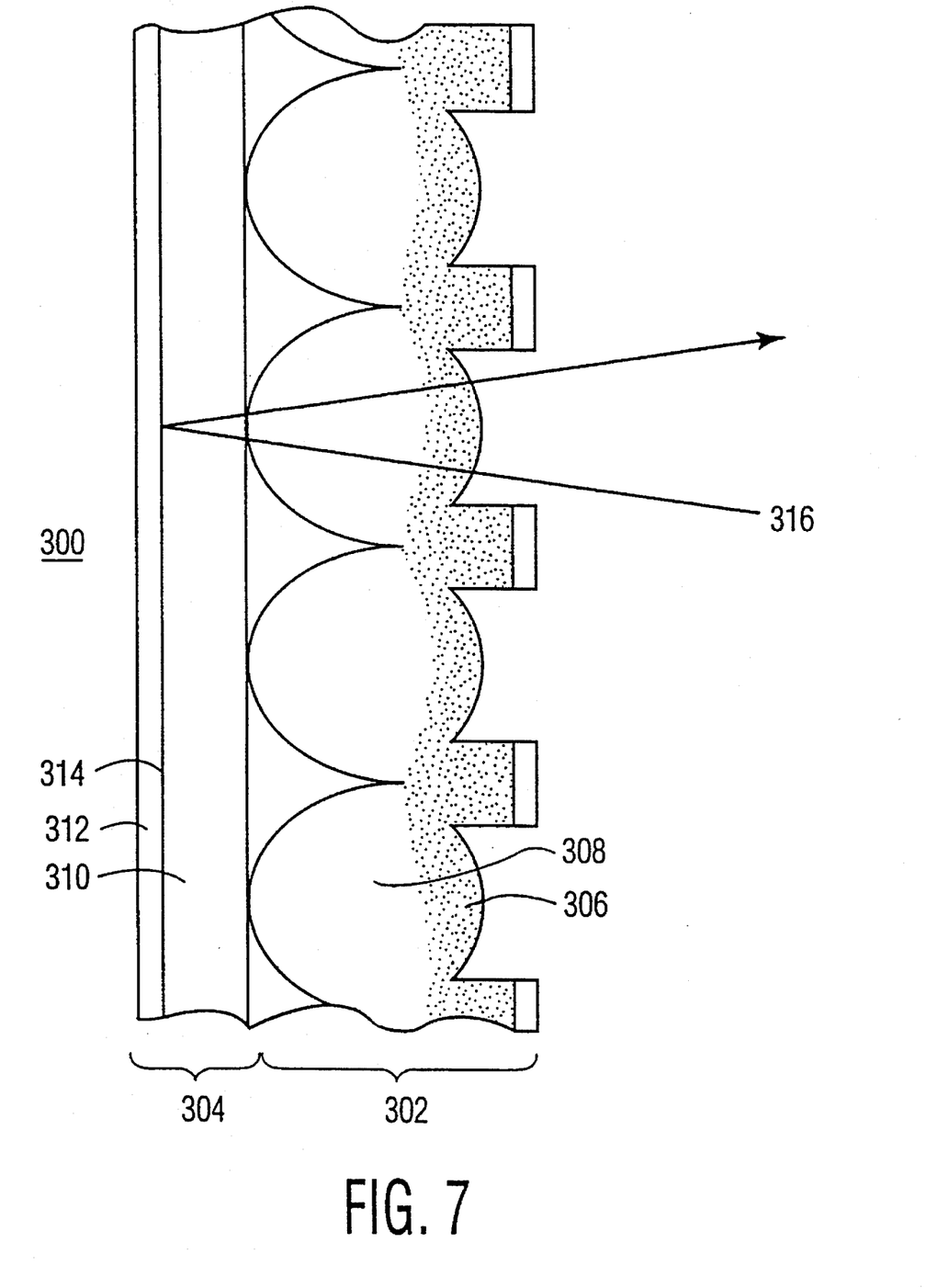
FIG. 7 is a schematic cross section similar to that of FIG. 2, except that a spacer region is present in the front portion.

In FIG. 7, screen 300 is composed of front portion 302 and rear portion 304, similar to front and rear portions 32 and 34 of FIG. 2, except that in front portion 302, the diffusion region is confined to a region 306 near the front surface, leaving a spacer region 308 which is free of light scattering particles. Rear portion 304 is similar to rear portion 34, composed of spacer layer 310 and layer 312 forming reflective surface 314. Thus, incoming ray 316 traverses diffusion region 306, spacer region 308 and spacer layer 310, before being reflected by surface 314, to re-traverse these regions and layer before exiting the screen, resulting in a reduced incidence of speckle when compared to the screen of FIG. 8.

The embodiments of FIGS. 2, 4, 5, 6 and 7 are particularly advantageous in that commercially available rear projection screens having surface or bulk diffusion can be employed as the front portion of the front projection screen of the invention. Such screens are described, for example, in JEI, December, 1993, pp. 27, 33.

FIG. 8 shows a front projection screen 400, having a front portion 402 of such a prior art rear projection screen, having a front lenticular array 404, raised portions 406 with light-absorbing layer 408, rear lenticular array 410 and bulk diffusion 412. The rear portion consists of mirror 403. Thus, the screen lacks the spacer layer 24 of FIG. 1.

The screens of FIGS. 2 and 8 were visually compared for focus, moire and speckle, for different thicknesses of the spacer layer 44. Results are shown in the following Table.

TABLE

| Spacer Layer | Focus | Moiré | Speckle |
| --- | --- | --- | --- |
| none (FIG. 8) | best | high | high |
| 3/32 inch | good | medium | low |
| 1/8 inch | moderate | low | low |

TABLE-continued

| Spacer Layer | Focus | Moiré | Speckle |
| --- | --- | --- | --- |
| ¼ inch | poor | low | lowest |

Figure 9:
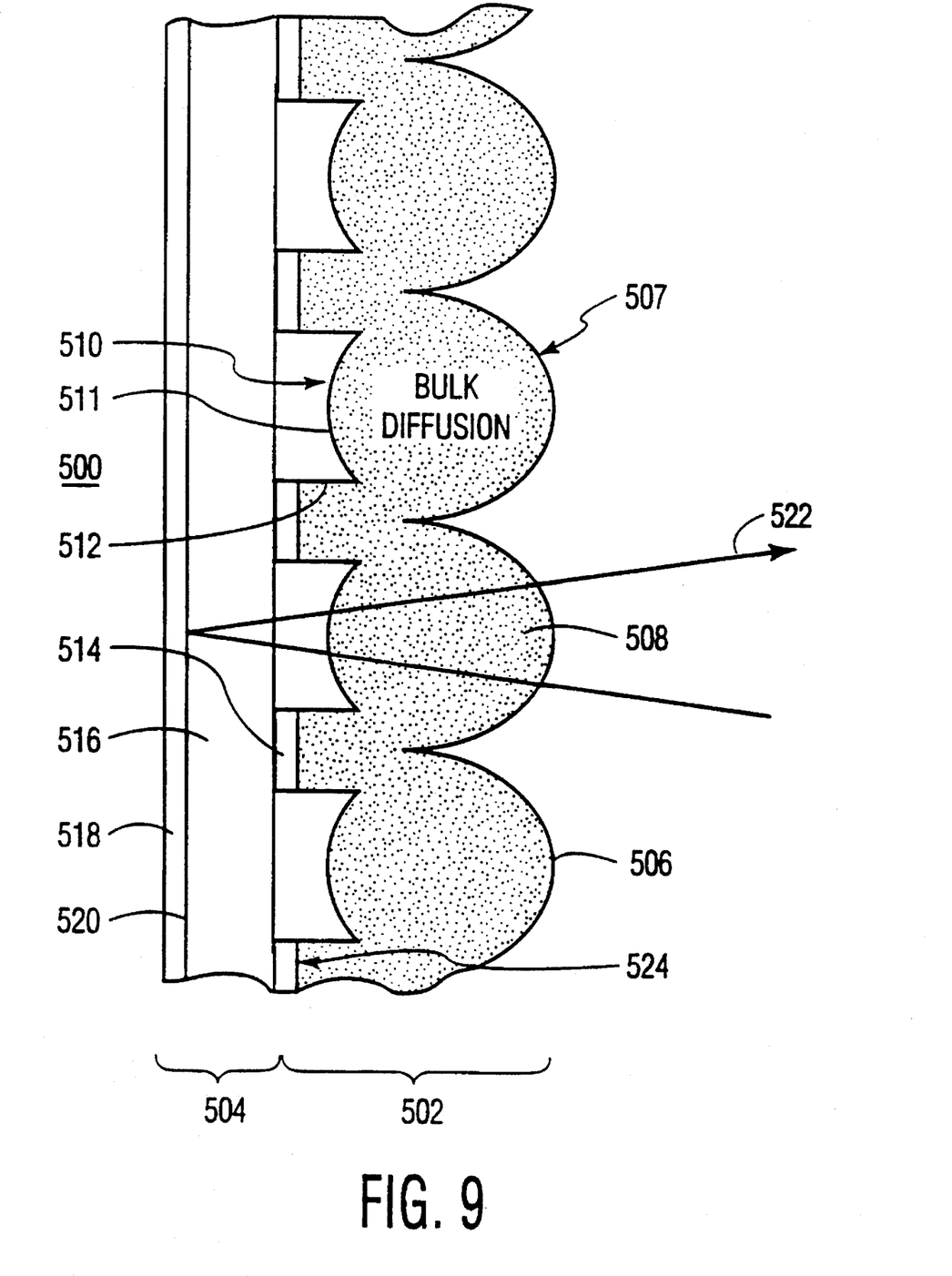
FIG. 9 is a schematic cross section of a front projection screen similar to that of FIG. 2, except that the light absorbing structure is associated with the rear lenticular lens array.

FIG. 9 shows a front projection screen 500, having a front portion 502 and a rear portion 504, similar to the front and rear portions 32 and 34 of FIG. 2, except that in front portion 502, the light absorbing structure is associated with the area lenticular lens array 510, instead of the front array 507. Thus, ribs 512 and light absorbing layers 514 are located between lenticules 511, and any light reaching such layers 514, such as ray 524, is absorbed.

The invention has been described in terms of a limited number of embodiments and variations of embodiments. Other embodiments and variations will become readily apparent to those skilled in the art, and are intended to be encompassed within the scope of the invention as defined in the appended claims.

What we claim as our invention is:

1. A front projection screen having a front portion and a rear portion, each portion having a front surface and a rear surface, the front portion having light scattering particles defining a diffusion region between the front and rear surfaces, the front surface of the front portion defining a front lenticular lens array, the array comprised of mutually parallel lenticules extending longitudinally across the screen, and the rear portion defining a reflective surface in spaced apart relationship to the diffusion region of the front portion.

2. The front projection screen of claim 1 in which stripes of light absorbing material are located between the lenticules of the front lenticular array.

3. The front projection screen of claim 2 in which the front surface of the front portion defines ridges between the lenticules, and the light absorbing material is located on top of these ridges.

4. The front projection screen of claim 1 in which the diffusion region extends to the rear surface of the front portion.

5. The front projection screen of claim 1 in which a spacer region is present in the front portion between the diffusion region and the rear portion.

6. The front projection screen of claim 1 in which the rear portion includes a spacer layer between the rear surface of the front portion and the reflective surface.

7. The front projection screen of claim 1 in which a rear lenticular lens array is defined by the rear surface of the front portion, the array comprised of a large number of mutually parallel lenticules extending longitudinally across the screen, the lenticules having tip regions.

8. The front projection lens of claim 3 in which the diffusion region extends to the rear surface of the front portion and the rear portion includes a spacer layer between the rear surface of the front portion and the reflective surface.

9. The front projection screen of claim 3 in which a spacer region is present in the front portion between the diffusion region and the rear portion and the reflective surface is the front surface of the rear portion.

10. The front projection screen of claim 7 in which the diffusion region extends to the rear surface of the front portion and the rear portion includes a spacer layer between the rear surface of the front portion and the reflective surface.

11. The front projection screen of claim 7 in which a spacer region is present in the front portion between the diffusion region and the rear portion and the rear portion includes a spacer layer between the rear surface of the front portion and the reflective surface.

12. The front projection screen of claim 7 in which a spacer region is present in the front portion between the diffusion region and the rear portion and the reflective surface is the front surface of the rear portion.

13. The front projection screen of claim 12 in which the reflective surface conforms to the contour of the rear lenticular lens array.

14. The front projection screen of claim 13 in which the reflective surface is confined to the tip regions of the lenticules.

15. The front projection screen of claim 7 in which stripes of light absorbing material are located between the lenticules of the rear lenticular array.

16. The front projection screen of claim 15 in which the rear surface of the rear portion defines ridges between the lenticules, and the light absorbing material is located on top of these ridges.

* * * * *